L. H. CHURCH.
CUTTER FOR CABLE ARMOR AND TUBING.
APPLICATION FILED APR. 27, 1907.
980,600.
Patented Jan. 3, 1911.
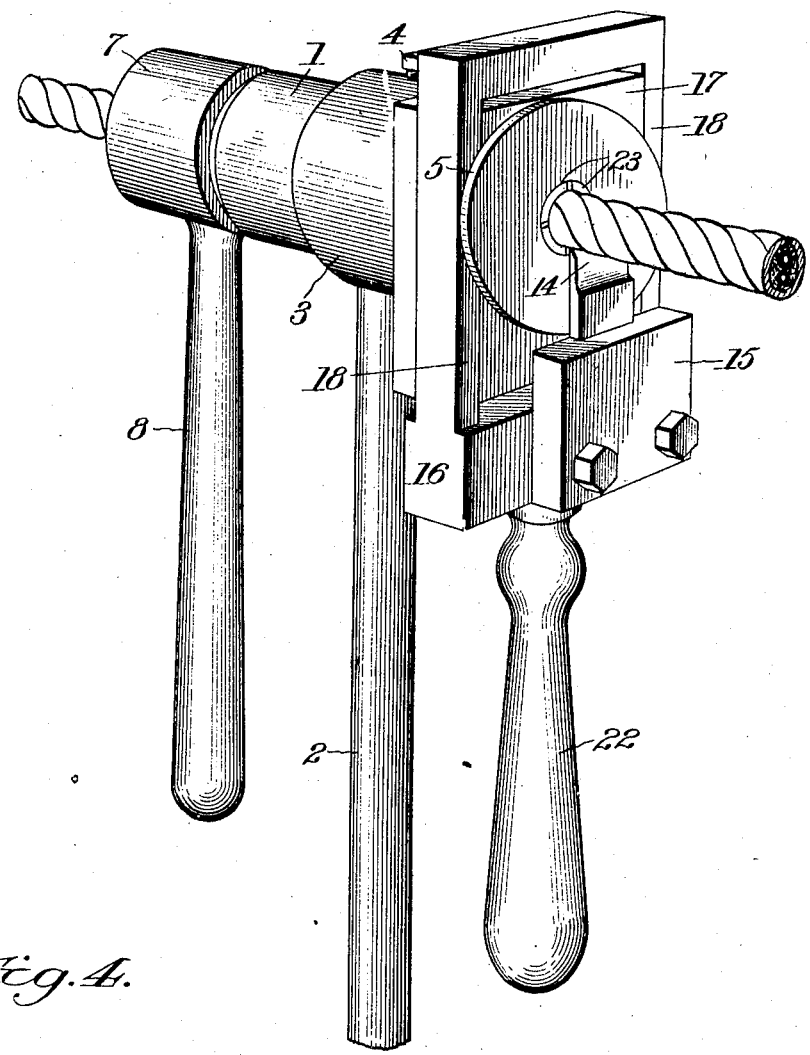
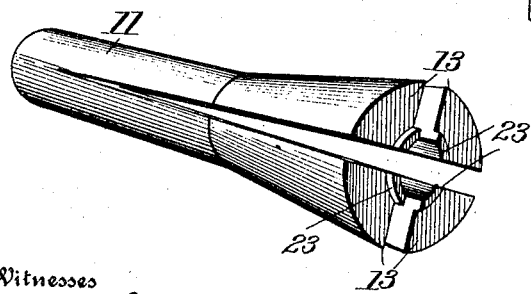
Witnesses
C. H. Walker,
James F. Crown
Inventor,
Lewis H. Church.
By Edward D. Duvall Jr.
Attorney

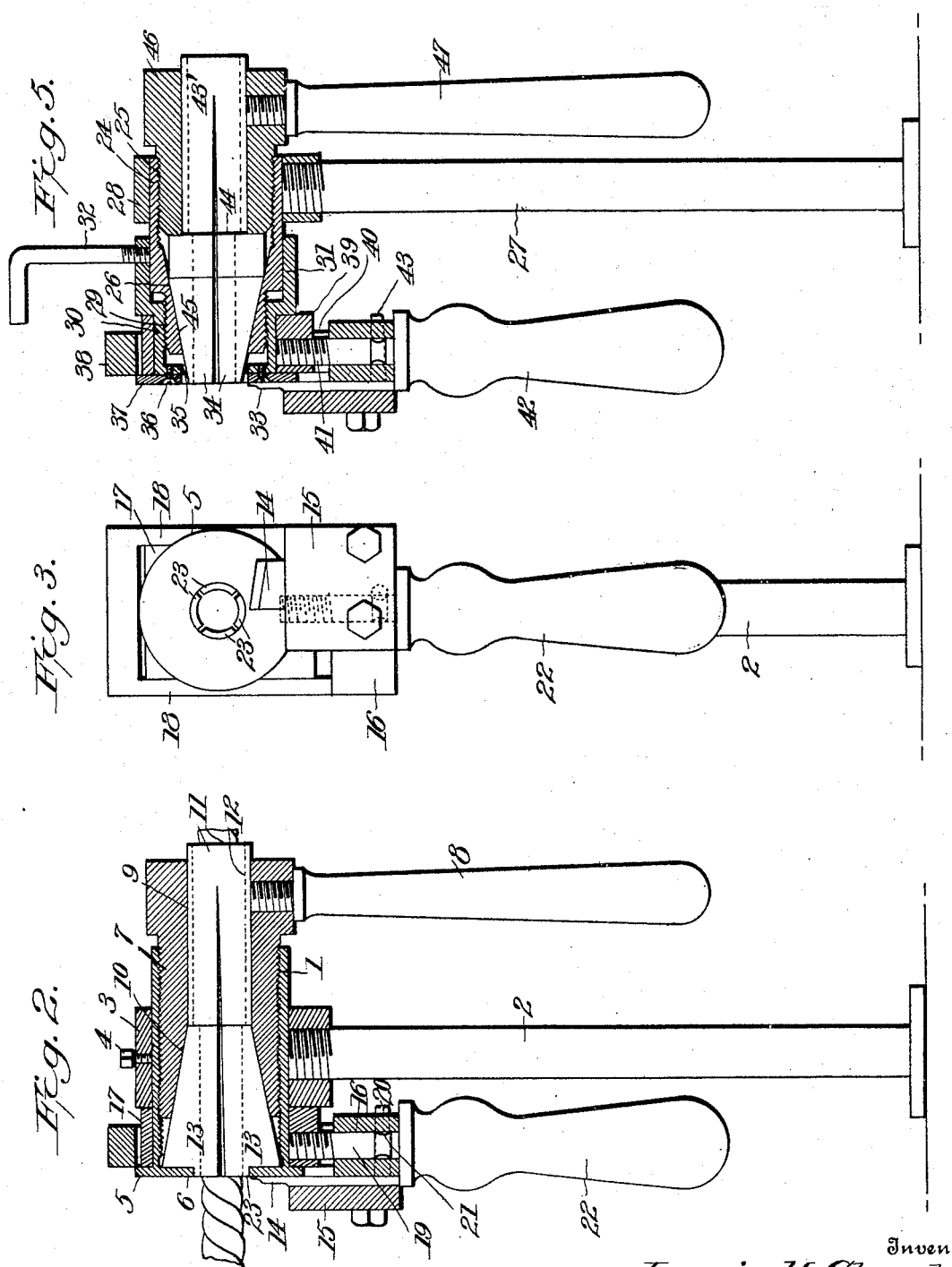

UNITED STATES PATENT OFFICE.

LEWIS H. CHURCH, OF STAMFORD, CONNECTICUT.

CUTTER FOR CABLE ARMOR AND TUBING.

980,600. Specification of Letters Patent. Patented Jan. 3, 1911.

Application filed April 27, 1907. Serial No. 370,714.

*To all whom it may concern:*

Be it known that I, LEWIS H. CHURCH, a citizen of the United States, residing at Stamford, in the county of Fairfield and State of Connecticut, have invented new and useful Improvements in Cutters for Cable Armor and Tubing, of which the following is a specification.

My invention relates to an improvement in cutters for stripping metallic armor from cables and for cutting tubing and the principal object is to provide means for cutting the armor quickly without injuring the inclosed cable and when used for cutting tubing to secure a perfect shear.

The device is especially adapted for cutting thin tubing.

With these and other objects and advantages in view the invention consists of the combination and arrangement of parts shown and described and especially pointed out in the claims.

In the drawings Figure 1 is a perspective view of my preferred form of invention; Fig. 2 is a vertical longitudinal sectional view; Fig. 3 is an end elevation of the same; Fig. 4 is a detailed view of the contractible jaw; and Fig. 5 is a vertical longitudinal sectional view of a modified form of the invention.

In the drawings similar numerals denote like parts throughout the several views.

1 is a tubular case which is interiorly threaded and is rigidly supported upon any suitable base by a standard 2 and annular sleeve 3 which is threaded upon the upper end of the standard. Sleeve 3, which surrounds the case 1, is provided with a set screw 4 to secure the case immovably in position. The case at one end is provided with the outer and inner flanges 5 and 6, the latter serving a purpose which will be apparent farther on. Threaded into the case is a follower 7, provided with an operating handle 8. This follower is provided with a cylindrical bore 9 which for a portion of its length from the inner end thereof is gradually tapered outward or flared as shown at 10, the whole bore being designed to receive a split tube 11 conforming to the contour of the bore of the follower. The split tube is of greater interior diameter for a portion of its length than the remaining part thereof as shown at 12, in order that the pressure to be applied to the cable, will be directly under the taper. The follower when tightened compresses the jaws 13, and secures the cable in an immovable position, after which the cutting-tool 14 is revolved about the armor or tube, whichever it may be, until the thickness thereof is cut through.

The cutting blade is held in place by a clamp 15 removably secured to a slidable frame 16. Within the frame is a block 17 revolubly mounted upon the case 1 between the sleeve 3 and the exterior flange 5 of the case. The frame is operated vertically upon the block 17, which latter is provided with a rear retaining flange 18 on each side thereof, by a threaded stud 19 which passes through the lower part of the frame and threads into the under side of the block 17. The stud turns freely in the frame and is held in place in the frame by means of a taper pin 20 passing through the frame and engaging a groove in the stud. This groove 21 is annular. An operating handle 22 is fixedly secured to the stud on the under side of the frame.

In order that the cutting tool 14, which is held in place against the flange 6, may be applied closely against the contractible jaws, in the preferred form, an extension 23 thereof is provided which projects so as to be flush with the flange of the case.

In the modified form shown in Fig. 5, the case 24, which is annular in shape, is interiorly threaded for a portion of a length as at 25, and the remainder of the interior bore is gradually tapered as shown at 26. This case as in the preferred form is supported by a standard 27 carrying at the top thereof an annular sleeve 28 secured to the case by any suitable means. The case has a reduced portion 29 which is exteriorly threaded to receive a sleeve 30, around which the tool-holder revolves. The sleeve 30 is constructed to conform to the casing and has the unthreaded part 31. A set screw 32 is provided for the purpose of rotating the sleeve to properly adjust the cutting tool 33 to the contractible jaws 34, and also to secure the same immovably in position after the adjustment is obtained. This sleeve is provided with an inwardly turned flange 35, to which is secured, by means of the screws 36, an annular washer 37 which retains in place the slidable frame 38. This frame slides upon the revoluble block 39, which is mounted upon the sleeve 30. This block is constructed with the side retaining flanges 40, and screw-threaded stud 41 passing through the end of the frame, and carrying an operating handle 42. The construction is the same as described in the preferred form, the pin 43 passing into the annular groove of the stud, retaining the latter in the frame, so that in both forms the rotation of the handle operates to slide the frame upon the revoluble block; and it is also used to revolve the tool-holder. The cutting-tool 33 is secured to the holder by the means described for the preferred form which permits adjustment for wear. In this form of the invention the contractible jaw through which the cable or tubing is passed, is constructed with a taper the reverse of that illustrated in the preferred form. A split tube is employed as shown at 43 having a shouldered portion 44 which is gradually tapered exteriorly toward the tool-holder as shown at 45. The bore in the tapered portion is of less diameter than in the remainder of the contractible cable or tubing-holder for the purpose explained in connection with the preferred form. Threaded into the case 24 is a follower 46 provided with an operating handle 47. This follower fits upon the reduced portion 43 of the contractible holder and the inner end abuts against the annular shoulder formed by the taper to the contractible holder. As in the preferred form, this follower is adjusted to close the jaws by contraction of the split tubular holder, which is formed of any suitable spring metal. Rotation of the follower compresses tapered portion of the holder about the cable or tubing, to be cut, and immovably holds the same while the tool-holder is rotated. This construction secures the cable or tubing precisely concentric with the rotating cutting-tool. When the cable or tubing is in position, the handle of the tool-holder is rotated sufficiently to move the cutting-tool into contact therewith, after which the tool-holder, which includes the frame and revoluble block, is rotated so that the cutting-tool encircles the cable or tubing and gradually cuts through the thickness thereof. As soon as it is cut the rotation of the tool-holder is stopped.

It will thus be seen that the armor of a cable may be cut without damage to the latter; or thin tubing may be easily cut with this device without damage thereto.

While the device is here shown as constructed for attachment to a permanent base or fixture, it will be understood that the standard 2 or 27 may be in the form of a handle so that the device may be operated by holding it firmly in the hand, while the other handles are rotated.

Having thus fully described my invention, what I claim as new and desire to secure by Letters Patent is:

1. The combination with a tubular case, of a split tube having a conical portion, a rotatable follower mounted in said case and adapted to contract the said split tube by compression of the conical portion thereof, a rotatable tool-holder mounted upon said case, means for securing a cutting-tool therein, and means for adjusting said cutting-tool with relation to the said split tube.

2. The combination with a tubular case, of a split tube having a conical portion, a rotatable follower mounted in said case and adapted to contract the said split tube by compression of the conical portion thereof, a revoluble block mounted upon the end of said case, a slidable frame mounted on said block and carrying a cutting tool, with means adjustably connecting the slidable frame and the block.

3. A device of the class described, comprising an inclosure, a cutting device rotatably mounted upon said inclosure, at one end, a chuck arranged interiorly of said inclosure and having resilient automatically expansible jaws for gripping the inserted work, an actuating member for said chuck, screw-threaded connection between said inclosure and said actuating member, said connection being effected interiorly of said inclosure.

4. A cutting-off tool comprising a tubular case, a contractible holder confined in the case and having a conical portion, a follower rotatably mounted in the case having its bore flared at one end for coaction with the conical portion of said holder, and a tool rotatably mounted with respect to the case.

5. A device of the class described including a tubular inclosure, a tubular holder arranged therein and having its bore of prescribed outline in cross-section, said holder having jaw-members adapted to form, when contracted, a continuation of the outline of said bore and to conform to the exterior surface of the object received thereby, means arranged intermediate of said jaw-members and said inclosure adapted to effect the contraction of said jaw-members as said holder is actuated for causing said jaw-members to engage said object, a tool-carrier rotatably mounted upon said inclosure, a tool carried by said carrier and means for adjusting the tool with respect to the holder.

6. Cutting-off apparatus comprising a case, an expansible holder confined in the case, a follower mounted in the case and adapted to contract said expansible holder, the said case having an annular retaining flange at one end, the expansible holder having extensions to engage the edge of said retaining flange, a block rotatably confined on the end of the case, a frame slidably connected with said block, a tool held in said frame, and a handle for operating the tool carrying frame adapted to advance the tool.

7. A device of the character described, comprising an inclosure, a tubular holder having resilient and automatically expansible chuck-forming members for gripping the inserted work, a cutting device rotatably mounted upon said inclosure at one end, and a tubular rotatable follower mounted upon said holder and having its bore flared at one end, said holder being of corresponding outline at one end for coaction with the flared end of the bore of said follower.

8. Cutting off apparatus embracing a case, a contractible holder arranged therein, a follower adapted to control the effective action of said holder, said case having a retaining flange at one end and said holder having extensions engaging said retaining flange, a rotatable tool carrier mounted upon said case and means for effecting the adjustment of the tool of said carrier with respect to said holder.

9. A device of the character described, including a tubular inclosure, a contractible holder arranged therein, formed of automatically retractable clamping members, means adapted to control the effective action of said holder, a tool carrier rotatably mounted upon said inclosure, and means for effecting the adjustment of the tool of said carrier with respect to said holder.

In testimony whereof I have hereunto affixed my signature in the presence of the following witnesses.

LEWIS H. CHURCH.

Witnesses:
 CAROLINE OSBORN,
 EDW. S. DUVALL, Jr.